United States Patent
Shabtay et al.

(10) Patent No.: US 12,328,523 B2
(45) Date of Patent: Jun. 10, 2025

(54) CAMERAS WITH SCANNING OPTICAL PATH FOLDING ELEMENTS FOR AUTOMOTIVE OR SURVEILLANCE

(71) Applicant: Corephotonics Ltd., Tel-Aviv (IL)

(72) Inventors: Gal Shabtay, Tel-Aviv (IL); Eran Briman, Tel Aviv (IL); Roy Fridman, Tel Aviv (IL); Noy Cohen, Tel Aviv (IL); Ephraim Goldenberg, Ashdod (IL); Gil Bachar, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 307 days.

(21) Appl. No.: 16/978,690

(22) PCT Filed: Jul. 4, 2019

(86) PCT No.: PCT/IB2019/055734
§ 371 (c)(1),
(2) Date: Sep. 5, 2020

(87) PCT Pub. No.: WO2020/008419
PCT Pub. Date: Jan. 9, 2020

(65) Prior Publication Data
US 2021/0120158 A1 Apr. 22, 2021

Related U.S. Application Data

(60) Provisional application No. 62/693,951, filed on Jul. 4, 2018.

(51) Int. Cl.
*H04N 3/08* (2006.01)
*B60R 22/48* (2006.01)
(Continued)

(52) U.S. Cl.
CPC ............... *H04N 3/08* (2013.01); *B60R 22/48* (2013.01); *G06F 18/25* (2023.01); *G06V 10/147* (2022.01);
(Continued)

(58) Field of Classification Search
CPC ............. H04N 5/2259; H04N 5/23219; H04N 5/23238; H04N 5/23296; H04N 5/247;
(Continued)

(56) References Cited

U.S. PATENT DOCUMENTS

| 4,199,785 A | 4/1980 | McCullough et al. |
| 4,792,822 A | 12/1988 | Akiyama et al. |

(Continued)

FOREIGN PATENT DOCUMENTS

| CN | 101276415 A | 10/2008 |
| CN | 201514511 U | 6/2010 |

(Continued)

OTHER PUBLICATIONS

OA in related KR patent application 2020-7033702, dated Jul. 12, 2022.

(Continued)

*Primary Examiner* — Sath V Perungavoor
*Assistant Examiner* — Kristin Dobbs
(74) *Attorney, Agent, or Firm* — Nathan & Associates; Menachem Nathan (57) ABSTRACT

Systems including dual-aperture zoom digital cameras with scanning optical path folding elements (OPFEs) for automotive or surveillance applications and methods for operating and using same. In some embodiments, a dual-aperture zoom digital camera comprises a Wide camera with a Wide field of view $FOV_W$, a Wide sensor and a Wide lens, wherein the Wide camera is operative to output Wide image information, a Tele camera with a Tele field of view $FOV_T$ (Continued)

smaller than $FOV_W$ and with a Tele sensor, a Tele lens with a Tele lens optical axis and a scanning OPFE, and a processing unit operative to detect an object of interest (OOI) from Wide and/or Tele image information and to direct the Tele camera to move $FOV_T$ to acquire Tele image information on the OOI.

20 Claims, 9 Drawing Sheets

(51) Int. Cl.
*G06F 18/25* (2023.01)
*G06V 10/147* (2022.01)
*G06V 20/56* (2022.01)
*G06V 20/59* (2022.01)
*G06V 40/10* (2022.01)
*G06V 40/16* (2022.01)
*H04N 5/265* (2006.01)
*H04N 23/58* (2023.01)
*H04N 23/611* (2023.01)
*H04N 23/69* (2023.01)
*H04N 23/698* (2023.01)
*H04N 23/90* (2023.01)
*G06V 20/52* (2022.01)

(52) U.S. Cl.
CPC ............ *G06V 20/56* (2022.01); *G06V 20/588* (2022.01); *G06V 20/597* (2022.01); *G06V 40/10* (2022.01); *G06V 40/161* (2022.01); *G06V 40/172* (2022.01); *H04N 5/265* (2013.01); *H04N 23/58* (2023.01); *H04N 23/611* (2023.01); *H04N 23/69* (2023.01); *H04N 23/698* (2023.01); *H04N 23/90* (2023.01); *B60R 2022/4808* (2013.01); *G06V 20/52* (2022.01)

(58) Field of Classification Search
CPC .......... H04N 5/265; H04N 3/08; G06V 20/52; G06V 40/10; G06V 20/597; G06V 40/161; G06V 10/147; G06V 20/588; B60R 22/48; G06K 9/6288
USPC .......................................................... 348/77
See application file for complete search history.

(56) References Cited

U.S. PATENT DOCUMENTS

| | | |
|---|---|---|
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |

(56) References Cited

U.S. PATENT DOCUMENTS

| | | |
|---|---|---|
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,406,972 B2 * | 9/2019 | Haight .................. G01S 13/862 |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0159344 A1 * | 7/2007 | Kisacanin .................. G06T 7/73 340/576 |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0234542 A1 * | 9/2009 | Orlewski ................ G08B 21/22 701/45 |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |

(56) References Cited

U.S. PATENT DOCUMENTS

| | | |
|---|---|---|
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296142 A1 | 10/2015 | Cappel-Porter et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1* | 10/2016 | Georgiev ............... H04N 23/57 |
| 2016/0301840 A1 | 10/2016 | Du et al. |
| 2016/0342095 A1* | 11/2016 | Bieling ............... G03F 7/70075 |
| 2016/0353008 A1 | 12/2016 | Osborne |
| 2016/0353012 A1 | 12/2016 | Kao et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0124987 A1 | 5/2017 | Kim et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1* | 10/2018 | Lee .................... H04N 23/67 |
| 2018/0300901 A1 | 10/2018 | Wakai et al. |
| 2019/0121103 A1 | 4/2019 | Bachar et al. |
| 2019/0121216 A1 | 4/2019 | Shabtay et al. |
| 2019/0215440 A1 | 7/2019 | Rivard et al. |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | 859191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: Eurographics, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

International Search Report and Written Opinion in related PCT application PCT/IB2019/055734, dated Dec. 16, 2019.

Tesla, "Future of Driving Advanced Sensor Coverage", Online Article, https://www.tesla.com/autopilot, p. 4.

ESR in related EP patent application 19830186.3, dated Jul. 2, 2021. 6 pages.

Office Action in related EP patent application 19830186.3, dated Jul. 9, 2021. 6 pages.

Office Action in related EP patent application 19830186.3, dated Jul. 6, 2023.

* cited by examiner

Digital Zoom

FIG. 10B

Optical Zoom by Tele camera

FIG. 10C

CAMERAS WITH SCANNING OPTICAL PATH FOLDING ELEMENTS FOR AUTOMOTIVE OR SURVEILLANCE

CROSS REFERENCE TO RELATED APPLICATIONS

This application is a 371 application from international patent application No. PCT/IB2019/055734 filed Jul. 4, 2019, which claims priority to U.S. Provisional Patent No. 62/693,951 filed Jul. 4, 2018, the content of which application is herein incorporated by reference in its entirety.

FIELD

Embodiments disclosed herein relate in general to digital cameras and in particular to thin zoom digital cameras.

BACKGROUND

Host devices having two cameras (also referred to as "dual-camera" or "dual-aperture camera") are known, see e.g. U.S. Pat. No. 9,185,291. The two cameras have lenses with different focal lengths and have respective image sensors operated simultaneously to capture an image. Even though each lens/sensor combination is aligned to look in the same direction, each will capture an image of the same scene but with a different field of view (FOV). As used herein, "FOV" is defined by the tangent of the angle between a line crossing the lens and parallel to the lens optical axis and a line between the lens and any object that is captured on the respective image corner. For simplicity, "image sensor" is referred to henceforth as "sensor".

Dual-aperture zoom cameras in which one camera has a "Wide" FOV ($FOV_W$) and the other has a narrow or "Tele" FOV ($FOV_T$) are also known, see e.g. U.S. Pat. No. 9,185,291. The cameras are referred to respectively as Wide and Tele cameras that include respective Wide and Tele sensors. These sensors provide respectively separate Wide and Tele images. The Wide image captures $FOV_W$ and has a lower spatial resolution than the spatial resolution of the Tele image that captures $FOV_T$. The images may be merged (fused) together to form a composite image. In the composite image, the central portion is formed by combining the relatively higher spatial resolution image taken by the lens/sensor combination with the longer focal length, and the peripheral portion is formed by a peripheral portion of the relatively lower spatial resolution image taken by the lens/sensor combination with the shorter focal length. The user selects a desired amount of zoom and the composite image is used to interpolate values from the chosen amount of zoom to provide a respective zoom image. Hereinafter, the use of "resolution" in this description refers to image spatial resolution, which is indicative to the resolving power of a camera as determined by the lens focal length, its aperture diameter and the sensor pixel size.

Dual-aperture cameras in which one image (normally the Tele image) is obtained through a folded optical path are known, see e.g. co-invented and co-owned U.S. patent application Ser. No. 14/455,906, which teaches zoom digital cameras comprising an "upright" (with a direct optical axis to an object or scene) Wide camera and a "folded" Tele camera, see also FIG. 2B below. The folded camera has an optical axis substantially perpendicular (orthogonal) to an optical axis of the upright camera. The folded Tele camera may be auto-focused and optically stabilized by moving either its lens or by tilting an optical path folding (reflecting) element ("OPFE"), e.g. a prism or mirror inserted in an optical path between its lens and a respective sensor. For simplicity, the OPFE is referred to hereinafter generically as "prism", with the understanding that the term may refer to any other optical path folding (reflecting) element that can perform the function of folding an optical path as described herein, for example a mirror.

For example, PCT patent application PCT/IB2016/056060 titled "Dual-aperture zoom digital camera user interface" discloses a user interface for operating a dual-aperture digital camera included in host device, the dual-aperture digital camera including a Wide camera and a Tele camera, the user interface comprising a screen configured to display at least one icon and an image of a scene acquired with at least one of the Tele and Wide cameras, a visible frame defining $FOV_T$ superposed on a Wide image defined by $FOV_W$, and means to switch the screen from displaying the Wide image to displaying the Tele image. The user interface further comprises means to switch the screen from displaying the Tele image to displaying the Wide image. The user interface may further comprise means to acquire the Tele image, means to store and display the acquired Tele image, means to acquire simultaneously the Wide image and the Tele image, means to store and display separately the Wide and Tele images, a focus indicator for the Tele image and a focus indicator for the Wide image.

Object recognition is known and describes the task of finding and identifying objects in an image or video sequence. Many approaches have been implemented for accomplishing this task in computer vision systems. Such approaches may rely on appearance-based methods by using example images under varying conditions and large model-bases, and/or on feature-based methods that search to find feasible matches between object features and image features, e.g., by using surface patches, corners and edges detection and matching. Recognized objects may be tracked in preview or video feeds using an algorithm for analyzing sequential frames and outputting the movement of targets between the frames.

The problem of motion-based object tracking may be divided into two parts:
(1) detecting moving objects in each frame. This may be done either by incorporating an object recognition algorithm for recognizing and tracking specific objects (e.g. a human face) or, for example, by detecting any moving object in a scene. The latter may incorporate a background subtraction algorithm based on Gaussian mixture models with morphological operations applied to the resulting foreground mask to eliminate noise. Blob analysis can later detect groups of connected pixels, which are likely to correspond to moving objects; and
(2) associating the detections corresponding to the same object over time, e.g., using motion estimation filters such as the Kalman filter.

In automotive or surveillance applications involving cameras it would be advantageous to have the ability to inspect a certain region of interest with high resolution. If addressed by a single camera, the required spatial resolution will force the single camera to have a sensor with a very large number of pixels.

There is therefore a need to identify a specific region of interest in an image with large field of view and steer a camera with a narrow field of view to that location.

SUMMARY

In various embodiments there are provided systems comprising dual-aperture zoom digital cameras with scanning OPFEs for automotive or surveillance applications and methods for operating and using same.

In exemplary embodiments, there are provided systems comprising: a Wide camera with a Wide field of view $FOV_W$ and comprising a Wide sensor and a Wide lens, wherein the Wide camera is operative to output Wide image information; a Tele camera with a Tele field of view $FOV_T$ smaller than $FOV_W$ and comprising a Tele sensor, a Tele lens with a Tele lens optical axis and a scanning OPFE; and a processing unit operative to detect an object of interest (OOI) from Wide and/or Tele image information and to direct the Tele camera to move $FOV_T$ to acquire Tele image information on the OOI.

In an exemplary embodiment, the system is installed in a vehicle and the processing unit is further operative to calculate a required measure-of-action or response needed from the vehicle.

In an exemplary embodiment, a system further comprises an actuator to tilt the OPFE to move the $FOV_T$.

In an exemplary embodiment, the processing unit is operative to direct the Tele camera to move $FOV_T$ to substantially a center of the $FOV_W$.

In an exemplary embodiment, the processing unit is operative to direct the Tele camera to move $FOV_T$ to a center of the OOI.

In an exemplary embodiment, the processing unit is operative to receive steering information from a steering wheel of the vehicle and to direct the Tele camera to move $FOV_T$ also based on the steering information.

In an exemplary embodiment, the processing unit is operative to receive steering information from a steering wheel of the vehicle and the actuator tilts the OPFE to move $FOV_T$ also based on the steering information.

In an exemplary embodiment, $FOV_W$ covers a road in front of the vehicle, the OOI is a road curve and the processing unit is operative to move $FOV_T$ to follow the road curve.

In an exemplary embodiment, the vehicle has a vehicle cabin, the OOI is located inside the vehicle cabin and the OPFE may be tilted to provide an extended Tele camera FOV ($FOV_E$) greater than $FOV_T$.

In an exemplary embodiment, the OOI is a driver of the vehicle and the required measure-of-action or response is based on a gaze of the driver.

In an exemplary embodiment, the OOI is a child and the required measure-of-action or response is a warning that the child does not wear a seat belt.

In an exemplary embodiment, the required measure-of-action or response includes a measure-of-action or response selected form the group consisting of changing speed and/or course of the vehicle, operating an internal alarm to a driver of the vehicle, operating an external alarm, sending data information to, or calling Internet/cloud based service/police/road assistance services, and a combination thereof.

In an exemplary embodiment, the OOI is a human face.

In an exemplary embodiment, the processing unit is operative to instruct the Tele camera to move to a specific location of the human face for face recognition.

In an exemplary embodiment, the processing unit is operative to instruct the Tele camera to move $FOV_T$ to scan parts of $FOV_W$ in two directions.

In an exemplary embodiment, the scan is performed by the scanning OPFE with a tilting and settling time of the OPFE of between 5-50 msec.

In an exemplary embodiment, the processing unit is operative to detect the OOI from Wide and/or Tele image information and to direct the Tele camera to move $FOV_T$ to acquire information on the OOI in automatic tracking mode.

In an exemplary embodiment, the Wide and Tele image information may be fused together to form a composite image or a composite video stream.

In an exemplary embodiment, each composite image has the same field of view.

In an exemplary embodiment, a composite image is formed by stitching a plurality of Tele images.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

DETAILED DESCRIPTION

Figure 1A:
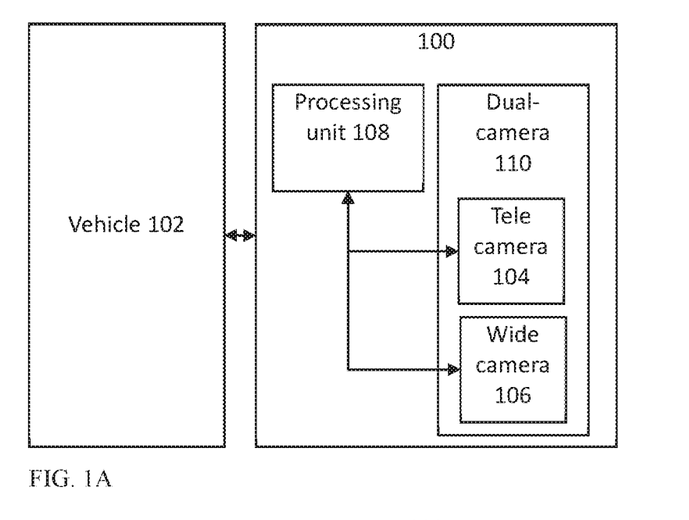
FIG. 1A shows an embodiment of a system disclosed herein.

FIG. 1A shows an embodiment of a system disclosed herein and numbered 100. System 100 may be installed in, or attached to a vehicle 102. System 100 includes a Tele camera 104, a Wide camera 106 and a processing unit ("processor") 108. The vehicle may be for example a car, a bus, a truck, a motorcycle, a coach or any type of know vehicle. Processing unit 108 may be a CPU, GPU, ASIC, FPGA, or any other processor capable of graphic analysis.

When used in conjunction with a vehicle, a system like system 100 may also be referred to as "advanced driver assistant system" or ADAS.

Figure 1B:
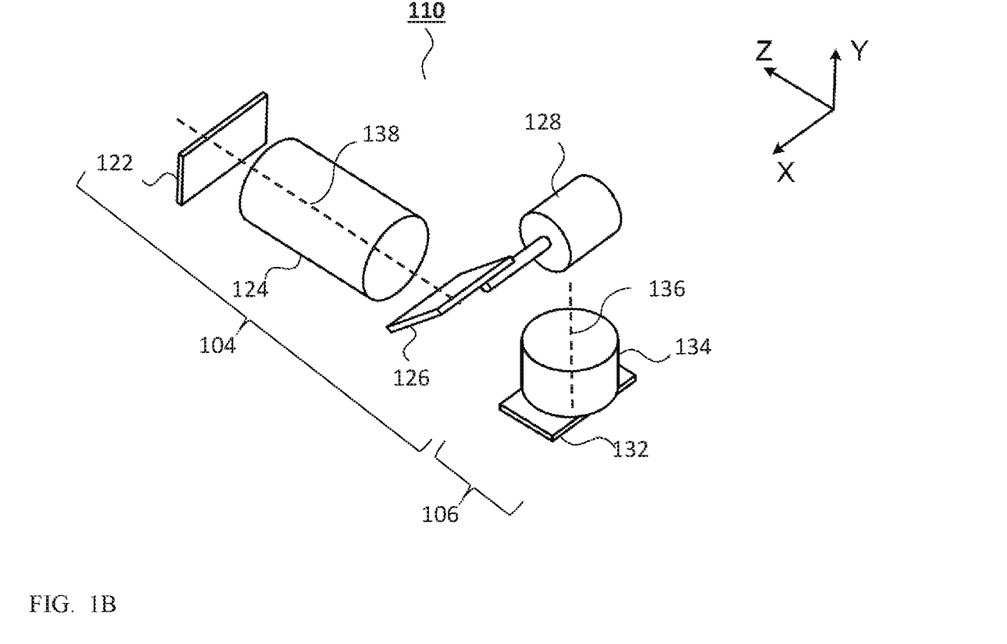
FIG. 1B shows an example of elements of a dual-camera in a perspective view.

The combination of Tele camera 104 and Wide camera 106 may be referred as "dual-camera" and is numbered 110. FIG. 1B shows an example of elements of a dual-camera 110 in a perspective view. Wide camera 106 comprises a Wide sensor 132 and a Wide lens 134 with a Wide lens optical axis 136. Wide sensor 132 is characterized by a Wide sensor active area size and a Wide sensor pixel size. Wide lens 134 is characterized by a Wide effective focal length (EFL) marked $EFL_W$. Optionally, in an embodiment, Wide lens 134 may have a fixed (constant) $EFL_W$. Optionally, the Wide lens may be fixed at a constant distance from Wide image sensor 132 (fixed focus). Optionally, Wide lens 134 may be coupled to a focusing mechanism (e.g. an autofocus (AF) mechanism) that can change the distance of Wide lens 134 from Wide image sensor 132, thereby providing a non-fixed (variable) focus). The combination of Wide sensor area and $EFL_W$ determines the Wide FOV ($FOV_W$). According to some examples, $FOV_W$ may be 50-100 degrees in the horizontal vehicle-facing direction.

Tele camera 104 comprises a Tele sensor 122 and a Tele lens 124 with a Tele lens optical axis 138. Tele sensor 122 is characterized by a Tele sensor active area size and a Tele sensor pixel size. Tele lens 124 is characterized by a Tele EFL, marked $EFT_T$. Optionally, in an embodiment, Tele lens 124 may have fixed (constant) EFL. In some embodiments, the Tele lens may be fixed at a constant distance from Tele image sensor 122 (fixed focus). Optionally, the Tele lens may be coupled to a focusing mechanism (e.g. an AF mechanism) that can change the distance of Tele lens 124 from Tele image sensor 122 (non-fixed focus). The combination of Tele sensor area and Tele lens $EFL_T$ determines the Tele FOV ($FOV_T$). According to some examples, $FOV_T$ may be between 10-30 degrees in the horizontal vehicle-facing direction. Thus, $FOV_T$ is smaller (narrower) than $FOV_W$.

Tele camera 104 further comprises an OPFE 126, e.g. a mirror or a prism. OPFE 126 has a reflection surface tilted by 45 degrees at a rest point from the Tele lens optical axis 138. Tele camera 104 further comprises an actuator (motor) 128. Actuator 128 may tilt the reflecting surface of OPFE 126 by up to ±α degrees from the rest point (where exemplary α may be up to 10, 20, 40 or 70 degrees). That is, actuator 128 may tilt or scan the OPFE and with it $FOV_T$. Actuator 128 may be for example a stepper motor, or a voice coil motor (VCM) as described for example in co-owned patent application PCT/IB2017/057706.

In some examples, Wide camera 106 and Tele camera 104 face a vehicle front side and share at least some of their respective FOVs. Typically, $FOV_W$ is directed away from the vehicle toward the front direction (driving direction) and is substantially symmetrical vs. the two sides of the vehicle. In one operational mode, the Tele camera is operational to scan the Tele FOV ($FOV_T$) inside the Wide FOV ($FOV_W$) using actuator 128. In some examples, the scanning of $FOV_T$ is for bringing the Tele camera to view more closely a detected potential object-of-interest (OOI), detected previously from Wide and/or Tele images, see in more detail below.

Figure 2:
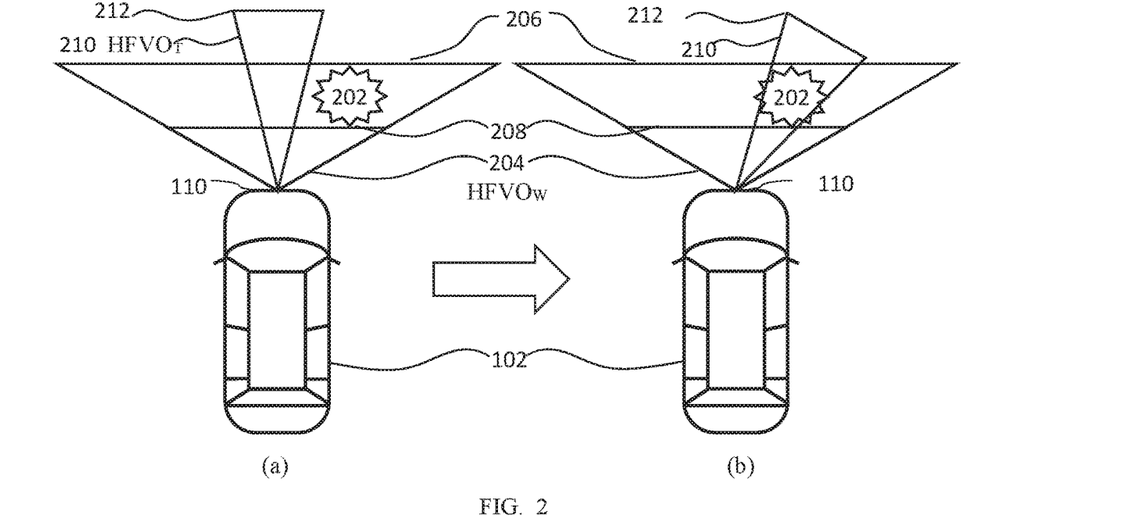
FIG. 2 shows schematically a use case of the system of FIG. 1A.

FIG. 2 shows schematically a use case of the system 100 of FIG. 1A. A dual-camera 110 is installed in a front part of a vehicle 102. For example, a triangle 204 represents $FOV_W$ in a horizontal plane, i.e. as a horizontal $FOV_W$ or "$HFVO_W$". In $FOV_W$, an "observation distance" 206 is defined as the maximal distance that allows system 100 using an image from the Wide camera to detect a potential OOI. "OOI" may be for example a hazard, another vehicle, a hole or obstruction on a road, a pedestrian, a road curve, a road sign, etc. An "identification distance" 208 is defined as the minimal distance that allows system 100 using an image from the Wide camera to identify all the required information for making a decision, as known in the art. According to one example, the OOI may be a road sign observable but not readable in the observation distance. According to an example, an OOI may be observed in the observation distance, but identification or distinction between it being a road sign or a pedestrian is made only within the identification distance. In other words, if an OOI is located before (closer to the Wide camera than) the observation distance 206 but further than the identification distance 208, then system 100 may use an image from the Wide camera to calculate that the OOI is located in $FOV_W$, but not to fully calculate required measures-of-action or response needed (see next).

According to some examples, measures-of-action or responses of system 100 may include one or more or a combination of the following: changing vehicle 102 speed and/or course, operating an internal alarm to the vehicle driver, operating an external alarm, sending data information to, or calling Internet/cloud based service/police/road assistance services, etc. For example, a triangle 210 represents $FOV_T$ in a horizontal plane, i.e. as a horizontal $FVO_T$ ($HFOV_T$). According to one example, $HFOV_W$ may be in the range of 70-180 degrees and $HFOV_T$ may be in the range of 15-45 degrees. According to another example, $HFOV_W$ may be in the range of 140-180 degrees and $HFOV_T$ may be in the range of 15-70 degrees. Thus, the output images of the Tele camera may have higher resolution than the output images of the Wide camera. For example, the output image of the Tele camera may have 3 to 20 times more resolution than the output image of the Wide camera, and consequently identification distance 212 of the Tele camera may be 3 to 20 times further away than identification distance 208 of the Tele camera.

In an example shown in (a) of FIG. 2, vehicle 102 approaches OOI 202. OOI 202 is located between observation distance 206 and identification distance 208. While OOI 202 is observable by the Wide camera, it may not identifiable (namely the Wide camera captures OOI 202 with too low a resolution to identify, classify or handle, relative to the required by system 100). As shown in FIG. 2(b), $POV_T$ is then scanned to face OOI 202 such that the Tele camera may capture OOI 202 with more detail (e.g. "identify" it).

Figure 3:
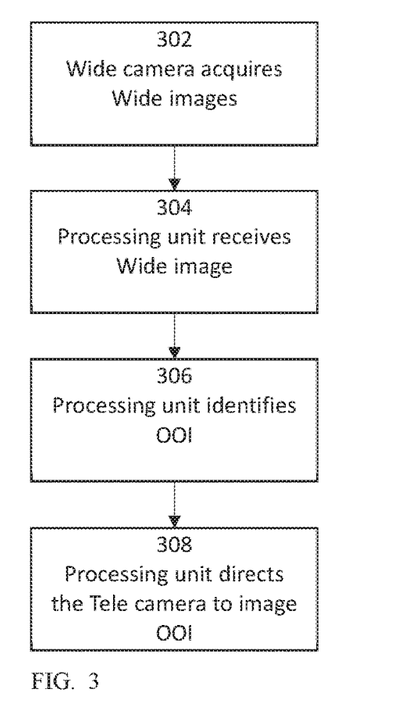
FIG. 3 shows a flow chart of a method in the use case of FIG. 2.

FIG. 3 shows a detailed flow chart of a method of operation of system 100 as in the example of FIG. 2:

Step 302: Exemplarily, the Wide camera (e.g. 106) acquires Wide images. In some alternative embodiments, images may also or optionally be acquired by the Tele camera.

Step 304: Exemplarily, the Wide camera sends Wide images acquired in step 302 to a processing unit (e.g. 108) for analysis. In some alternative embodiments, Tele images acquired in step 302 may also or optionally be to sent to the processing unit for analysis.

Step 306: The processing unit detects the existence of OOI 202 in front of vehicle 102, but requires more details to address or decide on a course of action.

Step 308: The processing unit directs the Tele camera (e.g. 104) to have $FOV_T$ face OOI 202 (i.e. by scanning the Tele camera), thereby acquiring and receiving images of OOI 202 with higher quality and/or higher resolution. The processing unit may then have more information on the OOI in order to fully calculate required measures-of-action or response needed.

In some examples, the Tele camera may be a camera equipped with a motor to drive the entire camera. In some examples, the Tele camera may be a folded camera as described in co-owned patent application PCT/IB2016/057366, in which the OPFE is operational to change (i.e. scan) a Tele camera point of view (POV). In some examples, the Tele camera may scan in one dimension (1D) only (i.e. along a line). In some examples, the Tele camera may scan in two dimensions (2D), namely scan an area. In some examples, the motor for scanning may be a VCM, a shape memory alloy (SMA) motor, a piezoelectric motor, a stepper motor or a DC motor. In some examples, the Tele camera and/or the Wide camera may be integrated with optical image stabilization (OIS) to compensate on vehicle vibrations.

Figure 4A:
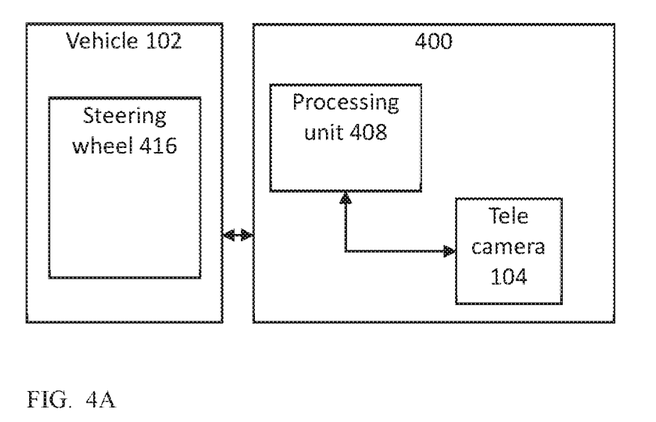
FIG. 4A shows another embodiment of a system disclosed herein.

FIG. 4A shows an embodiment of a system numbered 400 installed in, or attached to a vehicle 402. Optionally, vehicle 402 may have a steering wheel 416. In some vehicles, handlebars (not shown) may replace a steering wheel, with the following description being relevant to both. In contrast with system 100, system 400 comprises only a Tele camera 404 (similar to Tele camera 102) and a processing unit 408 (similar to processing unit 108).

Figure 4B:
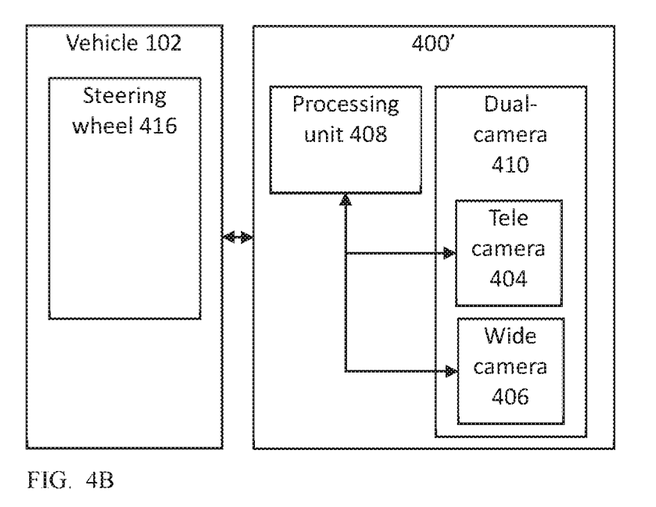
FIG. 4B shows yet another embodiment of a system disclosed herein.
Figure 5:
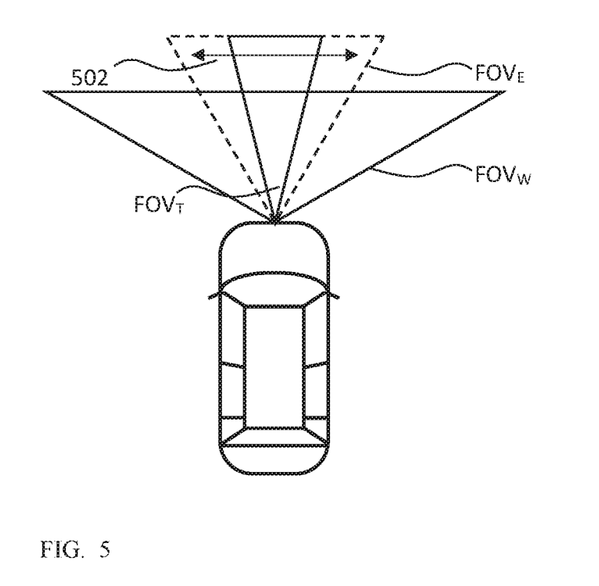
FIG. 5 shows schematically a use case of the systems of FIG. 4A or 4B.
Figure 6A:
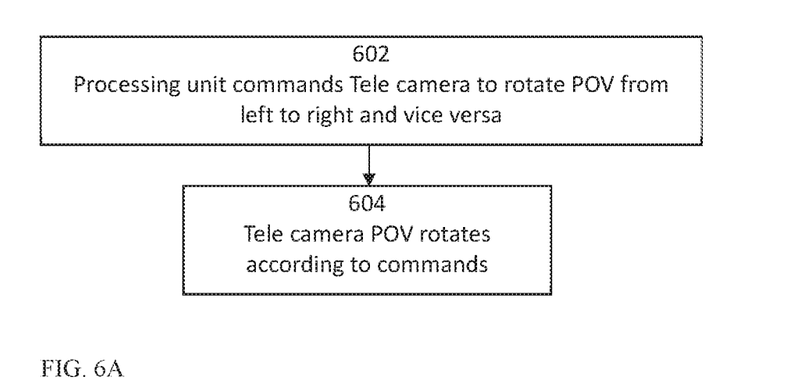
FIG. 6A shows schematically a method of use of the systems in FIG. 4A or 4B.
Figure 6B:
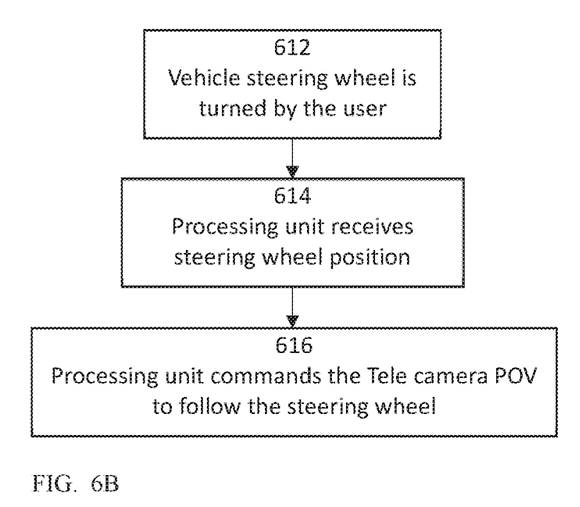
FIG. 6B shows schematically another method of use of the systems in FIG. 4A or 4B.
Figure 6C:
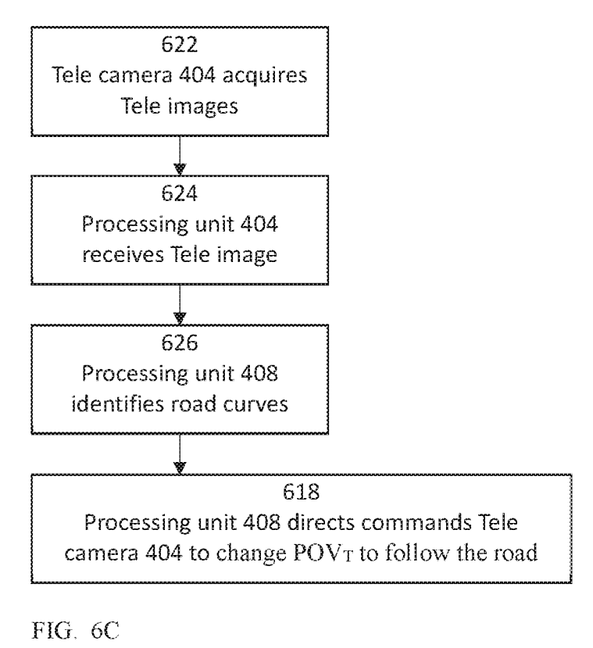
FIG. 6C shows schematically yet another method of use of the systems in FIG. 4A or 4B.

FIG. 4B shows an embodiment of another system numbered 400', similar to system 100 i.e. comprising a Wide camera 406 in addition to Tele camera 404. The description below refers to systems 400 and 400'. The Tele camera faces the vehicle front side. As seen in FIG. 5, in system 400, Tele camera 404 is operational to change angle/direction of $POV_T$ as marked by an arrow 502, thereby achieving an "effective" FOV marked $FOV_E$, which is larger than $FOV_T$. According to one optional use case of system 400 (FIG. 6A), a processing unit constantly commands the Tele camera to continually change the POV direction or angle from left to right and vice-versa (602), and the Tele camera rotates according to the commands received (604). In a second optional use case of system 400 (FIG. 6B), the processing unit follows the steering wheel or handle bars: when the user turns the steering wheel/handle bar to the left (612), the Tele camera POV ($POV_T$) moves to the left, and when the user turns the steering wheel/handle bar to the right, $POV_T$ moves to the right. According to a third optional use case of system 400 (FIG. 6C), the processing unit may use image recognition algorithm to identify road curves and change $FOV_T$ to follow the road.

Figure 7A:
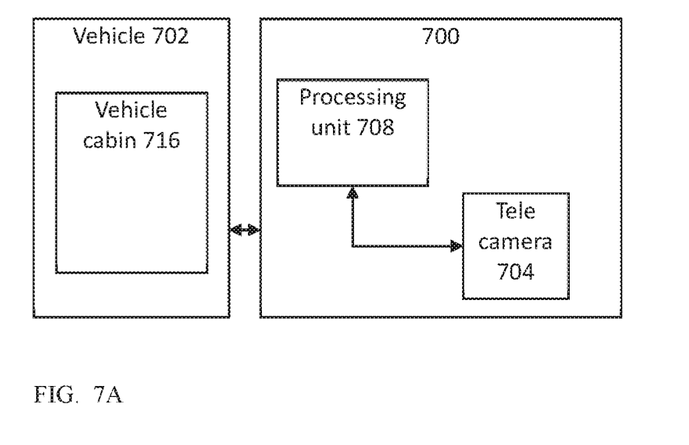
FIG. 7A shows yet another embodiment of a system disclosed herein.

FIG. 7A shows another shows an embodiment of another system numbered 700 (similar e.g. to system 400) that may be installed in, or attached to a vehicle 702. Vehicle 702 comprises a vehicle cabin 716.

Figure 7B:
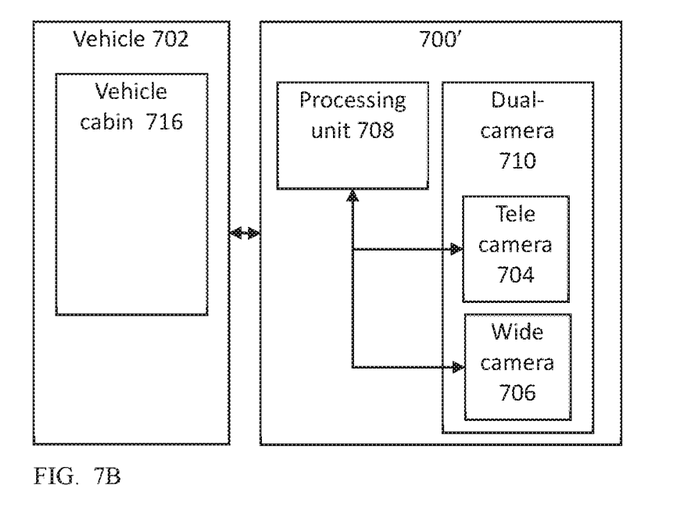
FIG. 7B shows yet another embodiment of a system disclosed herein.

FIG. 7B shows an embodiment of yet another system numbered 700', similar to system 100 and including a Wide camera 706 (like camera 106) in addition to Tele camera 704. Wide camera 706 may also be installed in vehicle cabin 716 to face OOI 802.

Figure 8:
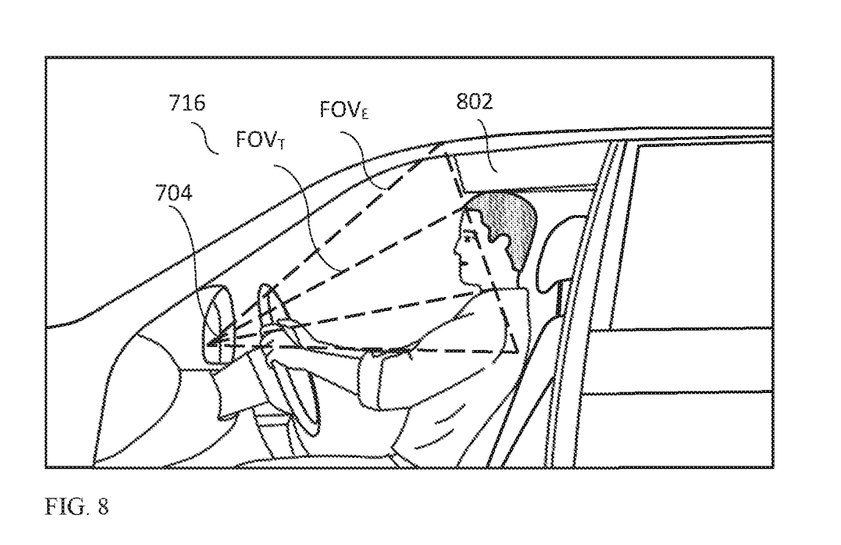
FIG. 8 shows a vehicle cabin section and use case of a system in FIGS. 7A and 7B.

FIG. 8 shows a vehicle cabin section and use case of a system in FIGS. 7A and 7B. Wide camera 706 is not shown. Tele camera 704 with $FOV_T$ faces the interior of vehicle cabin 716 and an OOI 802, for example a passenger. Tele camera 704 may be scanned to allow the effective FOV ($FOV_E$) larger than $FOV_T$.

Figure 9A:
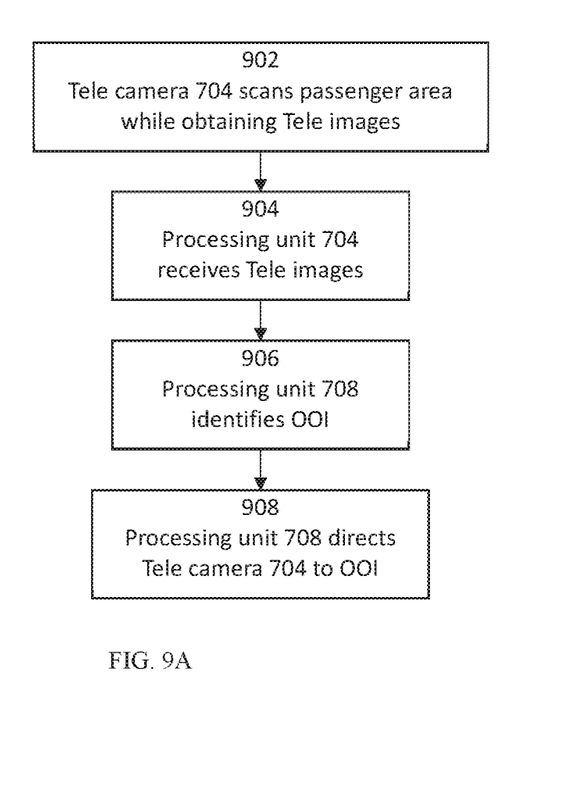
FIG. 9A shows schematically a method of use of the systems in FIG. 7A.
Figure 9B:
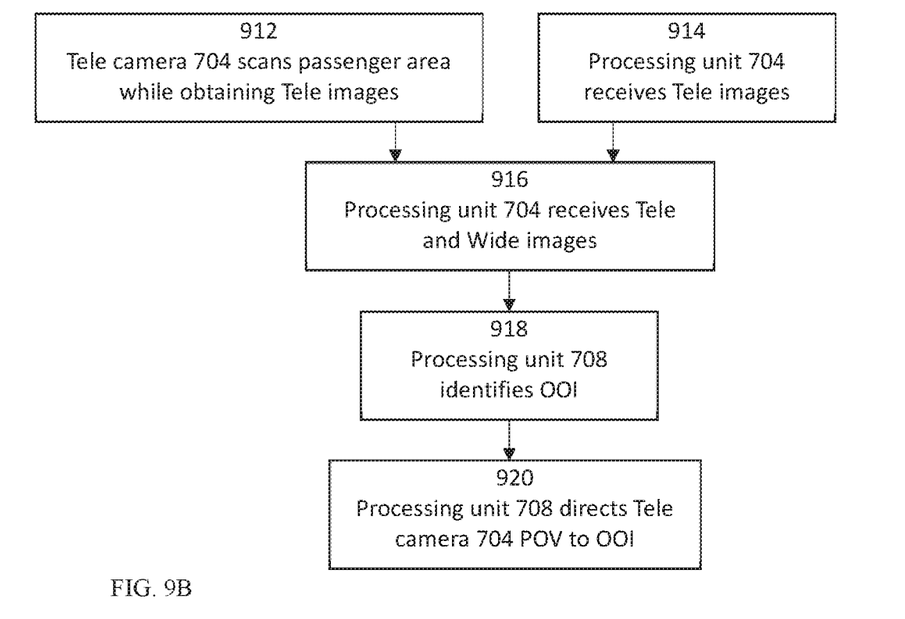
FIG. 9B shows schematically another method of use of the systems in FIG. 7B.

FIG. 9A shows in a flow chart main steps of a method of use of system 700. Tele camera 704 is operational to change angle/direction and scan vehicle cabin 716. Processing unit 708 is operational to identify an OOI 802 (e.g. passenger body, face, eyes, etc.). Processing unit 708 is further operational to direct Tele camera 704 to face OOI 802. The data obtained by the Tele camera is used for identifying hazards (e.g. driver not looking at the road, driver falling asleep, passengers without seatbelts, a child without a child seat, etc.). FIG. 9B shows in a flow chart main steps of a method of use of system 700'. The processing unit uses data from both Wide and Tele cameras to direct the Tele camera to OOI 802.

Figure 10A:
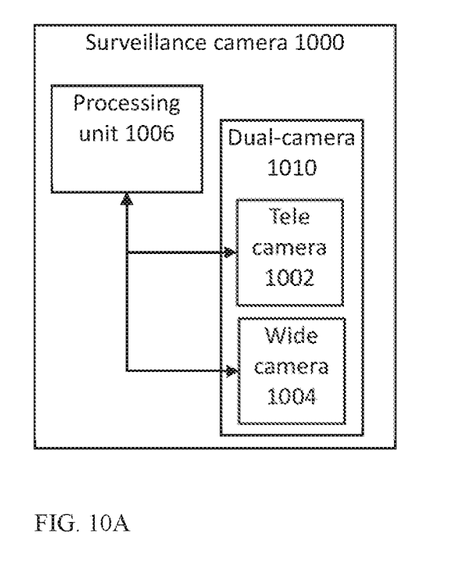
FIG. 10A shows yet another embodiment of a system disclosed herein.

FIG. 10A shows an embodiment of yet another system disclosed herein and numbered 1000. System 1000 comprises a Tele camera 1002, a Wide camera 1004 and a processing unit 1006 and may be used for surveillance, thus being also named "surveillance camera". Tele camera 1002 and Wide camera 1004 are part of a dual-camera 1010. These components may be similar to or even identical with Wide and Tele cameras and processors described in embodiments above. Surveillance camera 1000 and processing unit 1006 may include software and algorithms to detect OOIs (for example human faces) in $FOV_W$ and to steer the Tele camera in X and Y directions in Wide images to these OOIs to enhance the image or video quality of these objects and to enable their analysis (e.g. for face recognition in the case where the object is a face).

Figure 10B:
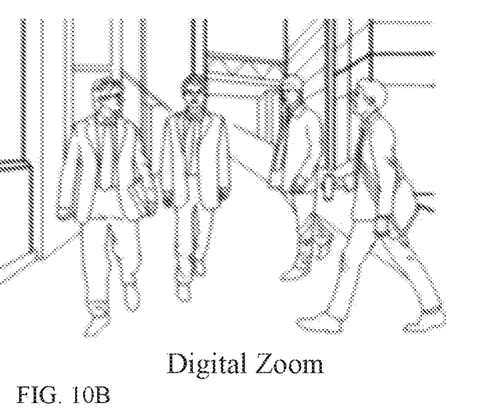
FIG. 10B shows the resolution of an image obtained with known digital zoom.
Figure 10C:
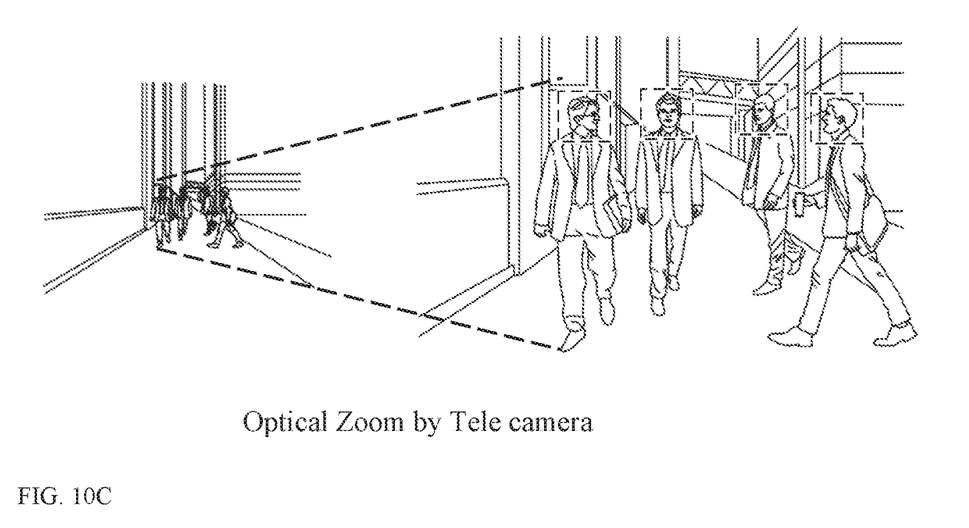
FIG. 10C shows the resolution of an image obtained with "optical" zoom using the system of FIG. 10A.

In an embodiment, processing unit 1006 may instruct Tele camera 1002 to continuously scan parts of $FOV_W$. In an embodiment, processing unit 1006 may instruct Tele camera 1002 to move to a specific location (as in FIG. 9). The tilting and settling time of the prism may occur in 5-50 msec. Further, Tele camera 1002 may switch from pointing from one region of interest (ROI) to another every 1 sec, or at a faster or slower pace. FIG. 10B shows an example of an imaged scene acquired by Wide camera 1004 and then digitally zoomed, and FIG. 10C shows an example of an imaged scene acquired by Wide camera 1004 (left side) and then by a directed Tele camera 1002 to optically zoom on the ROI (right side). The zoomed image in FIG. OC shows significant resolution gain over the digitally zoomed image in FIG. 10B, allowing for example facial recognition of people in the ROI.

Wide and Tele images and/or video streams may be recorded during automatic tracking mode and may be fused together to form a composite image or a composite video stream, as known in the art. This fusion may be applied on a camera hosting device (e.g. a mobile electronic device of any type that includes a system or camera disclosed herein). Alternatively, Wide and Tele images or video streams may be uploaded to the cloud for applying this fusion operation. Each composite image may also have the same FOV, by scanning with the Tele camera, stitching a plurality of Tele images to provide a "stitched" Tele image, then fusing the stitched Tele image with a Wide image. This is advantageous in that the Wide image captures the entire scene simultaneously, while the Tele images to be stitched together are consecutive, so one can overcome motion or occlusions in the scene if required. The stitching of the Tele images and/or the fusion of the stitched Tele image with the Wide image may also be performed in a cloud.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A system, comprising:
a) a Wide camera with a Wide field of view $FOV_W$ and comprising a Wide sensor and a Wide lens, wherein the Wide camera is operative to output Wide image information;
b) a Tele camera with a Tele field of view $FOV_T$ smaller than $FOV_W$ and comprising a Tele sensor, a Tele lens with a Tele lens optical axis and a scanning optical path folding element (OPFE); and
c) a processing unit operative to observe an object of interest (OOI) in the Wide image information, to determine that the OOI is further than a distance that allows identification of the OOI in the Wide image information, to direct the Tele camera to move the $FOV_T$ to acquire Tele image information on the OOI observed in the wide image information, and to identify the OOI in the Tele image information.

2. The system of claim 1, wherein the system is installed in a vehicle and wherein the processing unit is further operative to calculate a required measure-of-action or response needed from the vehicle.

3. The system of claim 2, further comprising an actuator to tilt the OPFE to move or scan the $FOV_T$.

4. The system of claim 2, wherein the processing unit is operative to direct the Tele camera to move the $FOV_T$ to substantially a center of the $FOV_W$.

5. The system of claim 2, wherein the processing unit is operative to direct the Tele camera to move the $FOV_T$ to substantially a center of the OOI.

6. The system of claim 2, wherein the processing unit is operative to receive steering information from a steering wheel of the vehicle and to direct the Tele camera to move or scan the $FOV_T$ based also on the steering information.

7. The system of claim 3, wherein the processing unit is operative to receive steering information from a steering wheel of the vehicle and wherein the actuator tilts the OPFE to move or scan the $FOV_T$ based also on the steering information.

8. The system of claim 2, wherein the $FOV_W$ covers a road in front of the vehicle, wherein the OOI is a road curve and wherein the processing unit is operative to move the $FOV_T$ to follow the road curve.

9. The system of claim 2, wherein the vehicle comprises a vehicle cabin, wherein the OOI is located inside the vehicle cabin and wherein the OPFE may be tilted to provide an extended Tele camera FOV ($FOV_E$) greater than $FOV_T$.

10. The system of claim 2, wherein the OOI is a driver of the vehicle and wherein the required measure-of-action or response is based on a gaze of the driver.

11. The system of claim 2, wherein the OOI is a child and wherein the required measure-of-action or response is a warning that the child does not wear a seat belt.

12. The system of claim 2, wherein the required measure-of-action or response includes a measure-of-action or response selected form the group consisting of changing speed and/or course of the vehicle, operating an internal alarm to a driver of the vehicle, operating an external alarm, sending data information to, or calling Internet/cloud based service/police/road assistance services, and a combination thereof.

13. The system of claim 1, wherein the OOI is a human face.

14. The system of claim 13, wherein the processing unit is operative to instruct the Tele camera to move to a specific location of the human face for face recognition.

15. The system of claim 13, wherein the processing unit is operative to instruct the Tele camera to move $FOV_T$ to scan parts of $FOV_W$ in two directions.

16. The system of claim 15, wherein the scan is performed by the scanning OPFE with a tilting and settling time of the OPFE of between 5-50 msec.

17. The system of claim 1, wherein the processing unit is operative to detect the OOI from Wide and/or Tele image information and to direct the Tele camera to move $FOV_T$ to acquire information on the OOI in automatic tracking mode.

18. The system of claim 1, wherein the Wide and Tele image information may be fused together to form a composite image or a composite video stream.

19. The system of claim 18, wherein each composite image has the same field of view.

20. The system of claim 19, wherein a composite image is formed by stitching a plurality of Tele images.

* * * * *